United States Patent
Kolano et al.

(10) Patent No.: US 7,826,799 B2
(45) Date of Patent: Nov. 2, 2010

(54) SYSTEM FOR CALIBRATING A HANDS-FREE SYSTEM

(75) Inventors: Guido Kolano, Salach (DE); Gerhard Uwe Schmidt, Ulm (DE); Walter Schnug, Memmingen (DE); Michael Tropp, Dornstadt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 738 days.

(21) Appl. No.: 11/782,514

(22) Filed: Jul. 24, 2007

(65) Prior Publication Data

US 2008/0020807 A1    Jan. 24, 2008

(30) Foreign Application Priority Data

Jul. 24, 2006   (EP)   .................................. 06015385

(51) Int. Cl.
*H04B 17/00*   (2006.01)

(52) U.S. Cl. .................... 455/67.14; 455/423; 455/424; 455/425; 455/67.11; 455/67.13; 455/68; 455/74.1; 455/570; 455/115.1; 455/115.2; 455/226.1; 702/85; 702/107; 702/117; 324/130; 324/527; 324/755; 324/763

(58) Field of Classification Search ......... 455/423–425, 455/67.11, 67.13, 67.14, 67.7, 68–69, 74, 455/74.1, 556.1, 557, 569.1–569.2, 570, 455/115.1–115.4, 226.1–226.2; 702/85, 702/106, 107, 117, 118, 122; 324/130, 527, 324/754, 755, 763, 765

See application file for complete search history.

(56) References Cited

U.S. PATENT DOCUMENTS

| 6,154,666 | A * | 11/2000 | Patterson et al. | .......... 455/575.1 |
| 6,195,572 | B1 * | 2/2001 | Patterson et al. | ............ 455/570 |
| 6,690,956 | B2 * | 2/2004 | Chua et al. | ............... 455/569.2 |
| 6,928,308 | B2 * | 8/2005 | Wang et al. | ............... 455/569.2 |
| 7,088,998 | B2 * | 8/2006 | Tolonen | ....................... 455/423 |
| 7,400,995 | B2 * | 7/2008 | Mattes et al. | ............... 702/118 |
| 7,519,392 | B2 * | 4/2009 | Kwak | ....................... 455/554.2 |
| 2004/0207422 | A1 * | 10/2004 | Lehtinen et al. | ............. 324/758 |

FOREIGN PATENT DOCUMENTS

| EP | 1376997 | A1 | | 1/2004 |
| EP | 1 583 265 | | * | 5/2005 |
| EP | 1583265 | A1 | | 10/2005 |
| FR | 2736490 | | | 7/1995 |

* cited by examiner

*Primary Examiner*—Tuan A Tran
(74) *Attorney, Agent, or Firm*—The Eclipse Group LLP (57) ABSTRACT

A method for calibrating a hands-free system is provided. The hands-free system comprising a hands-free unit and a mobile phone, the method comprising the following steps of setting up a connection between the hands-free system and a distant terminal via a mobile telephony network of the mobile phone, transmitting a predetermined test signal from one of the hands-free system and the distant terminal to the other of the hands-free system and the distant terminal, the predetermined test signal being provided in both the hands-free system and the distant terminal as reference test signal, comparing the received test signal to the reference test signal stored in the other of the hands-free system and the distant terminal, and determining the calibration parameters of the hands-free system in accordance with the comparison.

27 Claims, 6 Drawing Sheets

SYSTEM FOR CALIBRATING A HANDS-FREE SYSTEM

RELATED APPLICATIONS

This application claims priority of European Patent Application Serial Number 06 015 385.5, filed on Jul. 24, 2006, titled SYSTEM AND METHOD FOR CALIBRATING A HANDS-FREE SYSTEM, which application is incorporated in its entirety by reference in this application.

BACKGROUND OF THE INVENTION

1. Field of the Invention

This invention relates to a method and a system for calibrating a hands-free system, such as a hands-free system utilized in a vehicle.

2. Related Art

In vehicles, hands-free systems are used for outputting audio signals of a remote subscriber using the loudspeakers that are normally provided in a vehicle. Several microphones are installed in different locations in the vehicle for picking up the signals of the passengers in the vehicle. In connection with a hands-free system, such microphones can be used instead of the microphones provided in the mobile phone. Additionally, signal processing can be used which is adapted to the vehicle environment. By way of example, noise reduction systems are used that are optimized to the different types of vehicles and that reduce the noise component in the signal detected by the microphone of the hands-free system.

For improving the speech quality in hands-free systems, an adaptation of the hands-free system to the mobile phone that is used in connection with the hands-free system is necessary. By way of example, a signal level coming from a remote user should always result in a same signal level that is output via the loudspeaker. The signal level should not depend on the mobile phone used in connection with the hands-free system. Mobile phones normally have different signal output levels so that an equalization of the signal level depends on the used mobile phone.

In the art, it is known to provide equalization parameters for the most commonly used mobile phones in order to adapt the hands-free system to the used mobile phones. These parameters can be stored in a storage unit of the hands-free system. When a mobile phone is connected to a hands-free system either wireless via Bluetooth or when the mobile phone is put into a cradle, the mobile phone is identified by the type of mobile phone connected. When it is known which type of mobile phone is being utilized, the corresponding calibration or equalization parameters can be loaded and used in a calibration unit to adapt the hands-free system to the mobile phone (e.g. by adapting the frequency response or by adapting the signal level).

This kind of calibration, however, has several drawbacks. When the calibration parameters are only determined for a specific type of mobile phone, an individual calibration to the mobile phone is not possible. There exist significant differences between different mobile phones of a certain type. Such differences may be due to the amplifiers used in the mobile phones. These amplifiers often have a varying output signal level of ±3 to 6 dB. An adaptation to the type of mobile phone used does not result in an optimum speech signal quality, as the processing parameters vary within one type of mobile phone.

Furthermore, it is possible that the calibrating parameters of a mobile phone change. By way of example, when a new software release is used in the mobile phone, the signal processing changes. In the event that a predetermined set of calibration parameters is used, these calibration parameters will be continuously used after the software update even if the characteristics of the mobile phone have changed. Even if new calibrated parameters are transmitted together with the software update, the problem may exist that some of these mobile phones use an older software version than other mobile phones of the same type. Normally, a differentiation between the different software types is not possible, as the actual version of the used software is normally not transmitted to a hands-free system during identification of the mobile phone.

A further disadvantage of known systems lies in the fact that calibration parameters can only be determined for mobile phones already existing on the market. When a new mobile phone is developed, the hands-free system may not have the corresponding calibration parameters, as the life cycle of a mobile phone is normally much shorter than the life cycle of a hands-free system used in a vehicle.

In summary, in prior art hands-free systems several drawbacks exist resulting in a non-optimal speech quality of the hands-free system. Accordingly, a need exists to provide a hands-free system in which the speech quality can be further improved and in which each individual mobile phone can be adjusted or calibrated to the hands-free system.

SUMMARY

A method for calibrating a hands-free system is provided, the hands-free system comprising a hands-free unit and a mobile phone, the method comprising the steps of setting up a connection between a hands-free system and a distant terminal via the mobile telephony network of the mobile phone. When a connection between the hands-free system and the distant terminal has been built-up, a predetermined test signal is transmitted from one of the hands-free system and the distant terminal to the other of the hands-free system and the distant terminal. This test signal is also provided in both the hands-free system and the distant terminal as a reference test signal. Due to the fact that the reference test signal is also provided in the receiving unit of both terminals, the received test signal can be compared to the reference test signal stored in the other of the hands-free system and the distant terminal where the test signal was received. Furthermore, the calibration parameters of the hands-free system are then determined in accordance with the comparison.

According to another implementation of the invention, the invention further relates to a system for calibrating a hands-free system, the hands-free system comprising a hands-free unit and a mobile phone. The calibration system comprises the hands-free system, the latter additionally comprising a loudspeaker for outputting a signal received by the mobile phone, and a microphone picking up a speech signal of a user of the hands-free system. Additionally, a first storage unit may be provided in the hands-free system storing the reference test signal. The calibration system further comprises a distant terminal transmitting a test signal to the hands-free system and/or receiving a test signal from the hands-free system, the distant terminal comprising a second storage unit also storing the reference test signal. As described above, the test signal is transmitted from one of the hands-free system and the distant terminal to the other, the system further comprising a calibration unit adapting the hands-free system to the used mobile phone, the calibration unit comparing the received test signal to the stored reference test signal and determines the calibration parameters in accordance with said comparison.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
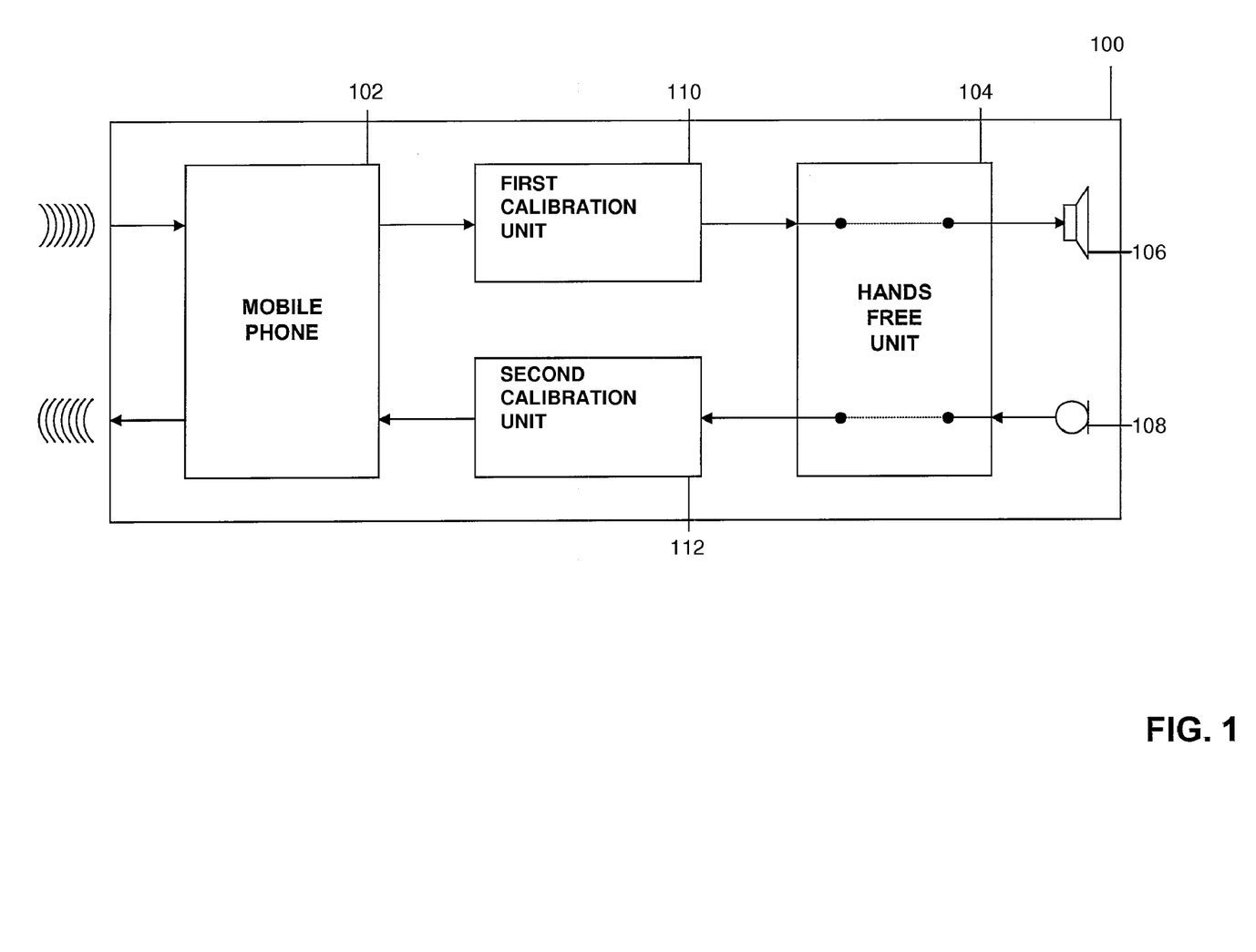
FIG. 1 illustrates one example of an implementation of a hands-free system in a vehicle using a calibration in the transmitting and receiving path.

FIG. 1 illustrates one example of an implementation of a hands-free system 100 in a vehicle using a calibration system in the transmitting and receiving path. The hands-free system 100 of FIG. 1 may be utilized in a vehicle (not shown) and may include a hands-free unit 104 in communication with a mobile phone 102. The mobile phone 102 receives audio signals via a telecommunication system (not shown) and transmits signals via the telecommunication system.

In the implementation shown in FIG. 1, the mobile phone 102 is used in connection with a hands-free unlit 104. When utilized in connection with a vehicle, as illustrated in FIG. 1, the hands-free system 100 can be connected to an audio system of the vehicle, especially to the loudspeakers 106 through which the signal received from the other end of the line may be output. Additionally, microphones 108 may be provided to pick-up voice signals of a user and transmit the voice signals via the hands-free unit 104 to the mobile phone 102 and then to the other end of the transmission line.

To achieve the high speech quality, the mobile phone 102 should be adapted to the hands-free unit 104. By way of example, each mobile phone 102 may have a different signal level, as the electronic components used in each mobile phone 102 may result in an amplification which is different for each mobile phone 102. The mobile phone 102 can be adapted to the hands-free unit 104 by a first calibration unit 110 provided in the receiving path and a second calibration unit 112 provided in the transmitting path of the system 100.

In one example of an implementation of the hands-free system 100, the calibration unit 110 provided in the receiving path can be used to attenuate the lower frequency components when the audio signal of the mobile phone 102 is output via the loudspeakers 106 of the vehicle. Generally, the loudspeaker incorporated into a mobile phone 102 is very small, so that the emitted audio signal is largely attenuated at lower frequencies. This attenuation can be reduced by using a filter to remove the attenuation in the lower frequency range. If, however, the loudspeakers of the vehicle are used to transmit the audio of the mobile phone 102 and the signal filter in the mobile phone 102 is not deactivated, the audio signal output by the loudspeakers 106 of the vehicle will have strongly reinforced lower signal components as the loudspeaker 106 provided in the vehicle will normally not attenuate the lower frequency components as much as the smaller loudspeaker in the mobile phone 102. To remove this effect, the calibration unit 110 can be used in the receiving path. The calibration unit 112 provided in the transmission path can further help to adapt the audio signal to the environment due to the fact that the microphones 108 of the vehicle are used instead of the microphones provided in the mobile phone 102. The calibration unit 112 can adapt the audio signal to be transmitted to the other end of the transmission line taking into account the different frequency responses of the microphones 108 compared to the frequency responses of the microphones (not shown) in the mobile phone 102.

Figure 2:
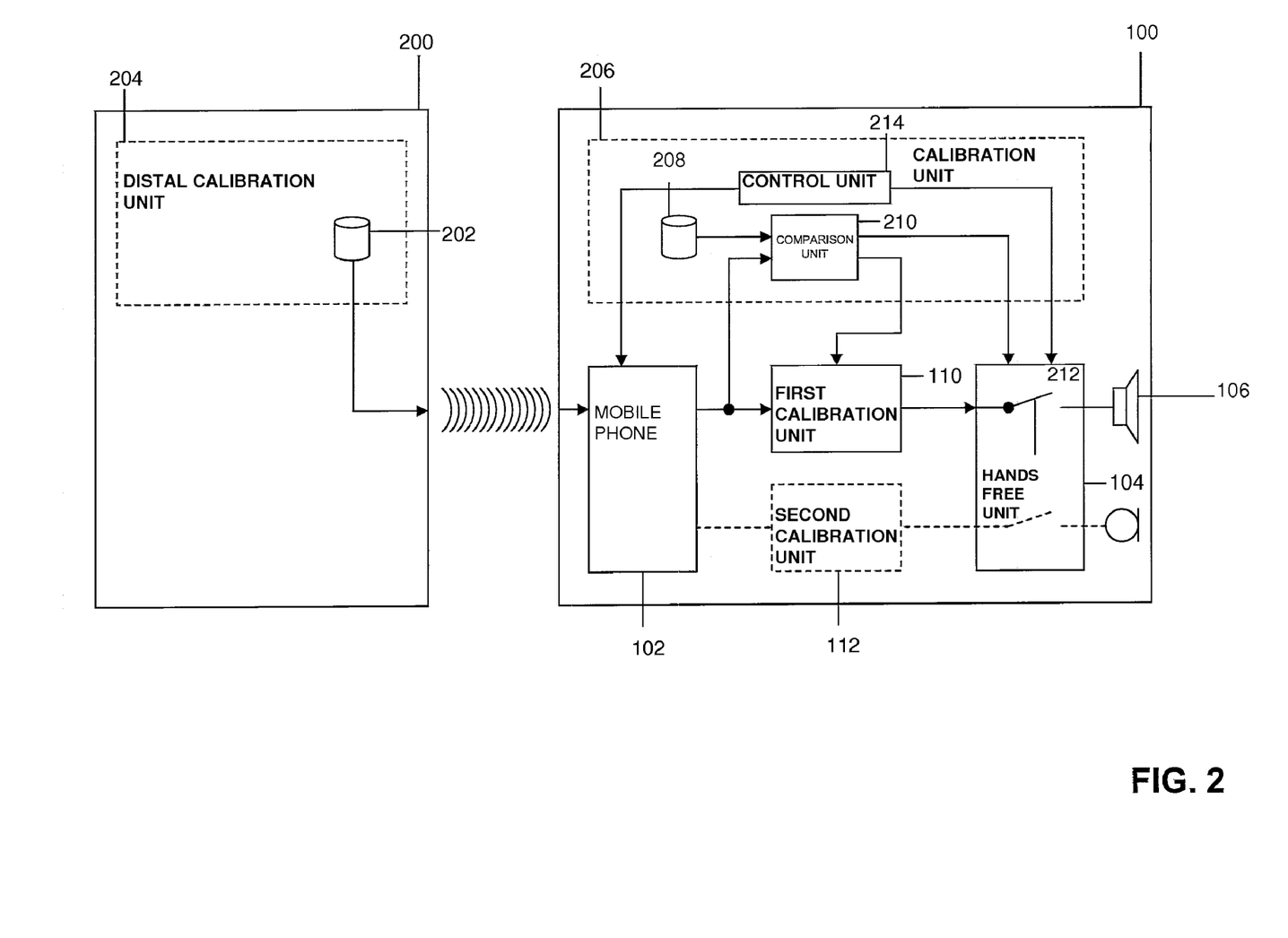
FIG. 2 illustrates one example of a system for calibrating the receiving path of a hands-free system of a vehicle.

FIG. 2 illustrates one example of a system for calibrating the receiving path of a hands-free system of a vehicle. In particular, in FIG. 2, a system is shown that can be used for individually calibrating each mobile phone 102 of a hands-free system 100. For example, when a user of the mobile phone 102 in the vehicle uses the mobile phone 102 in connection with the hands-free unit 104, a detection unit (not shown) can detect when a mobile phone 102 is used for which no calibration has been carried out. In one example of an implementation, the driver of the vehicle 100 may be informed that it is possible to calibrate the mobile phone 102 to the hands-free system 100. If the user or driver agrees to the calibration, the system 100 comprising the mobile phone 102 and the hands-free unit 104 will build a connection to a distant terminal 200 via the telephony network of the mobile phone 102. The system 100 in the vehicle can now initiate a transmission of a test signal stored in a storage unit 202 of the distant terminal 200. The distant terminal also comprises a distal calibration unit 204 in which the storage unit 202 having the different test signals may be provided.

The system 100 shown in FIG. 2 further includes a calibration unit 206. The distant terminal 200 transmits a test signal stored in the storage unit 202 to the hands-free system 100 in the vehicle. This transmitted test signal should be a time variant broadband audio signal which is to be transmitted by the telephony network. Preferably, the test signal should be designed in such a way that the transmitted signal is not changed too much by the coding methods of the telephony network, such as GSM or CDMA. Different test signals are recommended by ITU, these test signals normally modeling human speech. By way of example, a test signal can be a composite source signal known in the art or an artificial voice signal. The test signals also depend on the storing capacities in the mobile phone 102 or the hands-free unit 104. If only a limited storage space is provided, it is also possible to use shift registers with feedback and time-dependent attenuation elements for generating the test signal. The test signals provided in the remote terminal 200 are also provided as reference test signals in the communication system in the vehicle in the storage unit 208.

The test signal from the storage unit 202 is transmitted to the hands-free communication system 100 in the vehicle where it is received by the mobile phone 102. The received test signal is then fed to a comparison -unit 210 where the received test signal is compared to the reference test signal stored in the storage -unit 208. To determine the influence from the receiving mobile phone 102, the reference test signal of the storage unit 208 should be generated the same way as the test signal in the storage unit 202 in the distant terminal 200. In the comparison unit 210, the signal is processed in such a way that the received test signal mainly corresponds to the reference test signal. The calibration parameters determined by the comparison are then fed to the first calibration unit 110 provided in the receiving path of the system. In the hands-free unit 104, a switch 212 is shown indicating that the transmitted test signal is not output via the loudspeaker 106. The result of comparison is also fed to the hands-free unit 104 for adapting the parameters of the hands-free unit 104 in accordance with the comparison.

Additionally, a control unit 214 can be provided controlling the adaptation of the hands-free unit 104 and the mobile phone 102 relative to each other. In FIG. 2, the second calibration unit 112 for the transmission path of the hand-free system 100 is shown in dashed lines, as it is not needed for calibrating the receiving path of the system containing the hands-free unit 104 and the mobile phone 102.

The distant terminal 200 can be a server accessible over the mobile communication system and may be run by the company also manufacturing the hands-free systems 100. However, the distant terminal 200 can also be run by any other authority.

Furthermore, it is possible to tale into account the mobile telephony network with which the test signals were transmitted. It is possible to store in the transmitted signal the type of network with which the test signal has been transmitted. This can by way of example help when different types of networks are used. By way of example, these network changes can occur when the hands-free system is used in connection with a UMTS mobile phone. If a UMTS network is provided, the UMTS network is used. If no UMTS network is provided, a GSM network is used. In this case the calibration parameters determined in connection with the transmission over a UMTS network should not be used for calibrating the system working in a GSM network or vice versa. Accordingly, it is possible to take into account the mobile network through which the test signal is transmitted. The calibration parameters may only be used for the network for which they were determined.

Figure 3:
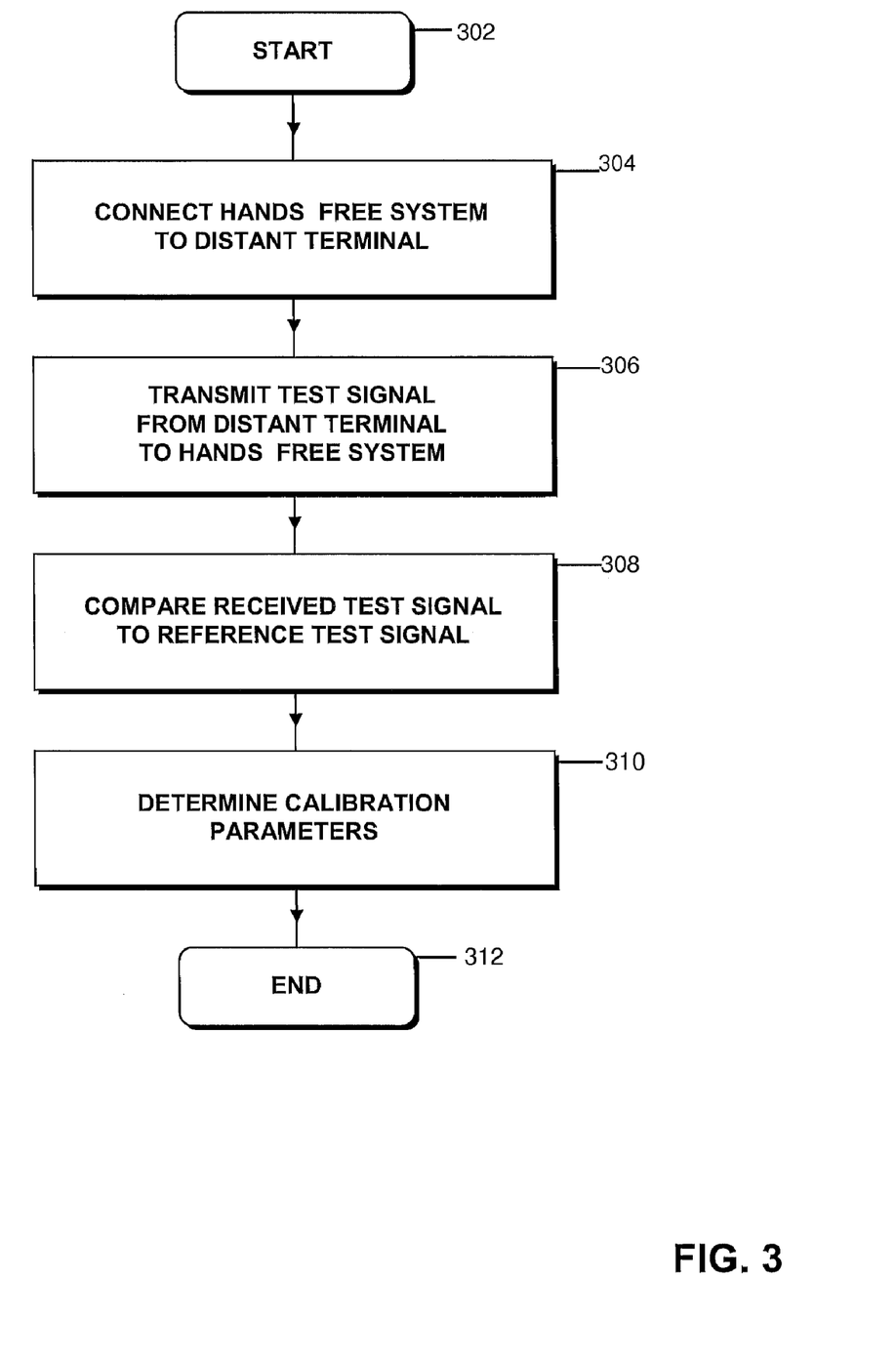
FIG. 3 illustrates a flowchart of one example of a method for calibrating the receiving path of a hands-free system shown in FIG. 2.

FIG. 3 illustrates a flowchart of one example of a method for calibrating the receiving path of a hands-free system shown in FIG. 2. In FIG. 3, the steps needed to adapt the receiving path of the hands-free system 100 are summarized. After the start of the process in step 302, the hands-free system 100 is connected to the distant terminal 200 at step 304. According to one implementation of the invention, the connection is initiated by the hands-free system 100 when it is determined that the connected mobile phone 102 is a mobile phone for which no calibration has been carried out. Furthermore, the hands-free system also determines which of the test signals should be transmitted from the distant terminal 200 to the hands-free system 100. It is possible that different test signals are transmitted that are needed for adapting the different parameters as will be discussed below. Furthermore, it is possible that only one test signal is transmitted for adapting a certain predetermined calibration parameter of the system 100.

When a connection has been finally built up in step 304, a selected test signal or test signals are transmitted from the distant terminal 200 to the hands-free system in step 306. After receiving the test signal, the latter is compared to the reference test signal stored in storage unit 208 in step 308. In step 310, the calibration parameters are determined by analyzing the received test signal and the reference test signals When the calibration parameters can be determined, the incoming audio signals can then be processed using the determined calibration parameters. The process ends in step 312.

In summary, it is possible to calibrate the receiving path as well as the transmitting path of the combined system comprising the hands-free unit 104 and the mobile phone 102. When the receiving path should be calibrated, the predetermined test signal is transmitted from the distant terminal to the hands-free system. The transmitted test signal is then received by the hands-free system and is compared to the reference test signal already provided in the hands-free system. By comparing the received signal to the reference test signal the influence of the receiving path of the hands-free system can be determined and the calibration parameters of the receiving path can now be adapted in accordance with the comparison. By comparing the reference test signal to the received test signal the influence of the receiving path of the system can be determined. The calibration parameters can now be controlled in such a way that this influence due to the receiving path can be removed by setting the calibration parameters in such a way that the received test signal substantially corresponds to the stored reference signal which did not undergo the transmission.

According to another implementation of the invention, each time when the mobile phone 102 is used together with a hands-free unit 104 the mobile phone 102 is identified. When it is known which mobile phone 102 is used, the hands-free system 100 can verify whether this mobile phone 102 has already been used together with the hands-free unit 104 before and whether a calibration has been carried out. If no calibration has been carried out for the presently used mobile phone 104, the calibration steps can be initiated.

Although as described above, the user is given the option to initiate calibration, the user of the mobile phone needs not to be informed of the calibration. To this end the received test signal transmitted from the distant terminal may not be output via the loudspeaker of the hands-free unit. Furthermore, the audio signal picked up by the microphone will not be transmitted to the distant terminal, as this distant terminal may only be used for calibrating the system.

Furthermore, it is possible to choose a test signal from a large variety of test signals. For example, a broadband time variant signal may be used as test signal. In the present context, a broadband test signal means that the bandwidth of the test signal substantially corresponds to the bandwidth of the audio signal transmitted by the mobile phone. Normally, the bandwidth transmitted in such communication systems is between 50 and 4,000 Hz. However, there exist also transmission systems transmitting frequency spectra up to 7,000 Hz. For measurements purposes, in these telecommunication systems, an artificial voice signal is recommended by the ITU (International Telecommunication Union). It is mathematically defined such that is models human speech. The long and short term spectra, the probability density function of speech signals, the voiced or unvoiced structure and the syllabic envelope for male and female speech are emulated.

It is also possible to use a composite source signal that comprises e.g. the following three sections: a 50 ms long voice signal taken from artificial voice intended to activate speech detectors in the system, a pseudo noise signal of about 200 ms duration during which measurements can be taken, and a pause that is long enough to set the system back into its quiescence state. The composite source signal can be repeated several times with alternative polarities. However, the invention is not limited to the above-mentioned test signals. The test signal used will also depend on the storage capacities of the hands-free system. If the storage capacity is limited, it is also possible to use shift registers for generating a test signal. In this case the register is filled with data. By xor-combinations of the different bit entries test signals can be generated. The time dependence of these test signals can be achieved by using a time variant damping element connected after the shift register.

Additionally, different ways of generating the test signals exist. According to one example of an implementation, the test signal and the reference test signal may be generated the same way in a distant terminal and the hands-free system. When these two signals are generated the same way, it can be assured that by comparing the transmitted test signal to the reference test signal only the influence of the transmission is present in the different signals.

Figure 4:
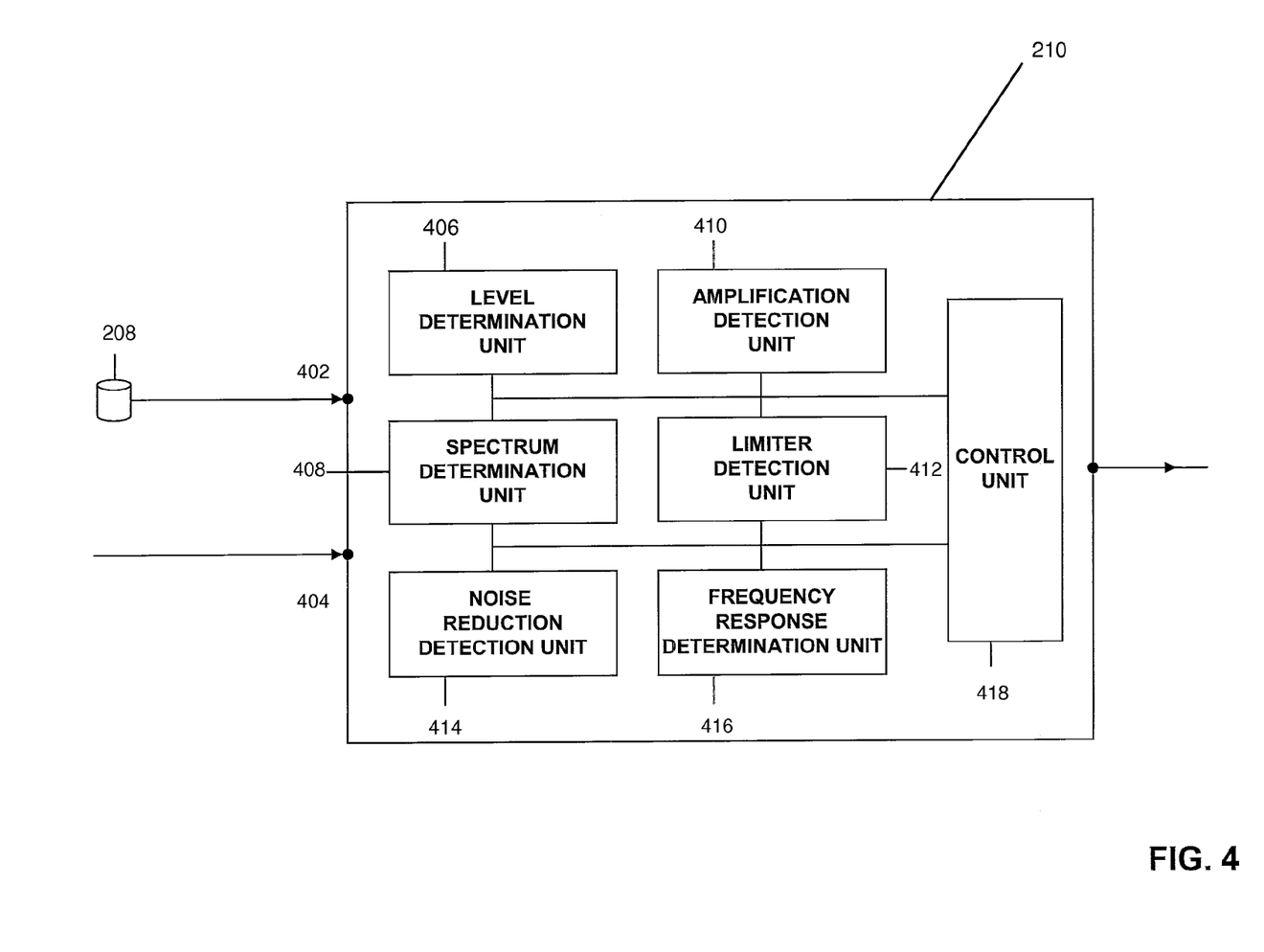
FIG. 4 illustrates an example of a comparison unit used for calculating the calibrating parameters of the hands-free system illustrated in FIG. 2.

FIG. 4 illustrates an example of a comparison unit 210 used for calculating the calibrating parameters of the hands-free system 100 illustrated in FIG. 2. In FIG. 4, an implementation of a comparison unit 210 is shown in more detail. The comparison unit 210 shown in FIG. 4 has two input terminals 402 and 404. The comparison unit 210 receives the reference test signal of the storage unit 208 and receives the signal transmitted from the distant terminal 200 at the input terminal 404. After receiving the two signals, the propagation time can be considered taking into account that one of the two signals was transmitted from a distant terminal 200. Once the propagation time has been considered, different calibration parameters can be calculated. By way of example a level determination unit 406 can determine the signal level of the two received signals. The level determination unit 406 can determine a time-averaged level of the received signal and compare the time-averaged signal level to the signal level of the reference test signal. The signal level difference between the two signals can then be removed or minimized by adapting the calibration parameters accordingly.

Additionally, it is possible to equalize the receiving signal response. To this end, a spectrum determination unit 408 can be provided determining the spectrum of the received signal. The spectrum determination unit 408 can determine the discrete Fourier transform of the two signals, or a linear predictive coding analysis (LPC analysis) can be carried out. When a LPC analysis is used, the equalizing can be obtained by a finite impulse response (FIR) filter or an infinite impulse response (IIR) filter.

Additionally, it is possible to determine whether in the mobile phone the signal amplification is controlled automatically in the receiving path. This can be done by an amplification detection unit 410 detecting whether an automatic control of the signal amplification is carried out in the mobile phone 102 (FIG. 1). In this case, the test signal can be a signal, the level of which varies during transmission. When this level difference of the incoming test signal is balanced, it is possible to deduce that an automatic level control is carried out in the mobile phone. The signal amplification of the hands-free unit 104 can then be determined accordingly.

Furthermore, the comparison unit 210 shown in FIG. 4 can comprise a limiter detection unit 412 detecting whether in the receiving path of the mobile phone 102 a limiter is present. For detecting the presence of a limiter, the test signal may comprise large amplitudes mainly corresponding to the maximum modulation. If a limiter was found to be present in the mobile phone 102, a possible limiter in the hands-free unit 104 should be either deactivated or adapted accordingly.

Furthermore, a noise reduction unit 414 can be provided detecting whether a noise reduction is carried out in a mobile phone 102. In one example, this can be detected by using a test signal having a predetermined amount of background noise. When the signal-to-noise-ratio is known for the transmitting and for the receiving system, it is possible to deduce whether a noise reduction is active in the mobile phone 102. The noise reduction in the hands-free unit 104 can then be adapted accordingly. Furthermore, a frequency response determination unit 416 can be provided. The knowledge of the frequency response of the mobile phone 102 can help to furthermore improve the speech quality in the hands-free system 100, as frequency components not provided in the transmitted signal can be generated using bandwidth extension methods. The calculation of the spectral components which were suppressed by the transmission system is possible with high accuracy when the frequency response of the mobile phone 102 is known. If the frequency response is known, the influence of the receiving path of the mobile phone 102 can be removed by calculating the calibration parameters accordingly. Lastly, a control unit 418 is provided for controlling the different units shown in FIG. 4. This control unit 418 may be part of the comparison unit 210 or may be part of the calibration unit 206, as illustrated in FIG. 2. Such control units 418, 210 may be separate or combined control units. The calculated calibration or equalizing parameters can then be fed to the first calibration unit 110 in the receiving path.

Furthermore, it is possible to calculate the propagation time difference or delay time between the transmitted test signal and the reference test signal provided in the other of the distant terminal and the hands-free system before the calibration parameters are determined. By way of example, the propagation time difference can be determined with the help of a correlation function. When the propagation time is known, the influence of the signal transmission can be taken into account when the received test signal is compared to the reference test signal.

One possibility to further analyze the hands-free system and to calculate the calibration parameters is to determine a time-averaged signal level of the received signal and to compare this averaged signal level to the time-averaged signal level of the reference test signal. The difference of the levels can then be removed by adapting the calibration parameters in such a way that the signal level of the received test signal substantially corresponds to the signal level of the reference test signal. By adapting the signal level variations, the signal amplification between different mobile phones can be removed.

In addition to the signal level correction, it is also possible to determined the power density spectrum of the received test signal and to compare the power density spectrum of the stored signal to the power density spectrum of the received test signal, the equalizing parameters of the hands-free system being determined in such a way that the power density spectrum of the received test signal substantially corresponds to the power density of the reference test signal. By way of example this correction of the frequency response is possible by determining the discrete Fourier transformation. Furthermore, the spectrum can also be determined using a LPC (Linear Predictive Coding) analysis. In the last case, the equalization can be achieved using a FIR or IIR filter. In both possibilities to calculate the spectrum the maximum attenuation and the maximum amplification should be limited. If, by way of example, a large attenuation of the transmitted signal at low frequencies should be removed, the noise of the system would be amplified without the use of a limitation of the attenuation. In order to avoid this noise amplification, maximum signal amplification and attenuation has to be determined as an upper and lower limit.

Another possibility for calibrating the system can be to determine whether in the receiving path of the mobile phone an automatic feedback control of the signal amplification is carried out. This can be achieved by using a test signal with varying signal level. If this automatic feedback control for the amplification is carried out, the amplification of the received signal in the hands-free unit should be adjusted to the signal amplification in the mobile phone.

Furthermore, it is possible to determine whether a noise reduction is carried out in the receiving path of the mobile phone by comparing the signal-to-noise-ratio of the received signal to the signal-to-noise-ratio of the provided reference signal. If a noise reduction is carried out in the mobile phone, the noise reduction in the hands-free system should be deactivated or adapted in accordance with the noise reduction in the mobile phone. By way of example, when the overall system should have a maximum attenuation of 12 dB and if a noise reduction was carried out in the mobile phone by 8 dB, the parameters of noise reduction in the hands-free unit have to be adapted in such a way that the maximum reduction in the hands-free unit is 4 dB. In addition to the noise reduction, it can be determined whether a signal level limitation is activated in the mobile phone. If this is the case, the amount of signal level limitation is determined and the signal level limitation in the hands-free unit is adapted in accordance with the signal level limitation in the mobile phone. In one implementation of the invention, the activation of a signal level limitation can be detected by using a test signal having large signal amplitude reaching the maximum possible amplitude.

Furthermore, according to another implementation of the invention, the frequency response of the mobile phone can be determined by comparing the spectrum of the received test signal to the spectrum of the reference test signal, the determined frequency response of the mobile phone being used for extending the bandwidth of the received audio signal of the mobile phone in wireless communication systems such as mobile telephone networks. The frequency components below a certain frequency such as 200 Hz or above a maximum frequency such as around 3,400 Hz are not transmitted by the transmission system. In order to improve the speech quality, these frequency components can be calculated and added to the received signal. For the calculation or estimation of the missing frequency components, it is advantageous to correctly determine the frequency response of the mobile phone. In this case, the bandwidth extension can be improved, the improved bandwidth extension resulting in a better signal quality of the speech signal.

When a connection between the hands-free system and the distant terminal is set up, it is also possible that the hands-free system first of all transmits the identification code to the distant terminal identifying the used hands-free unit and the mobile phone. This transmission of a signal to the distant terminal can also initiate the transmission of the test signal from the distant terminal to the hands-free system when the receiving path of the hands-free system comprising the mobile phone should be calibrated.

Figure 5:
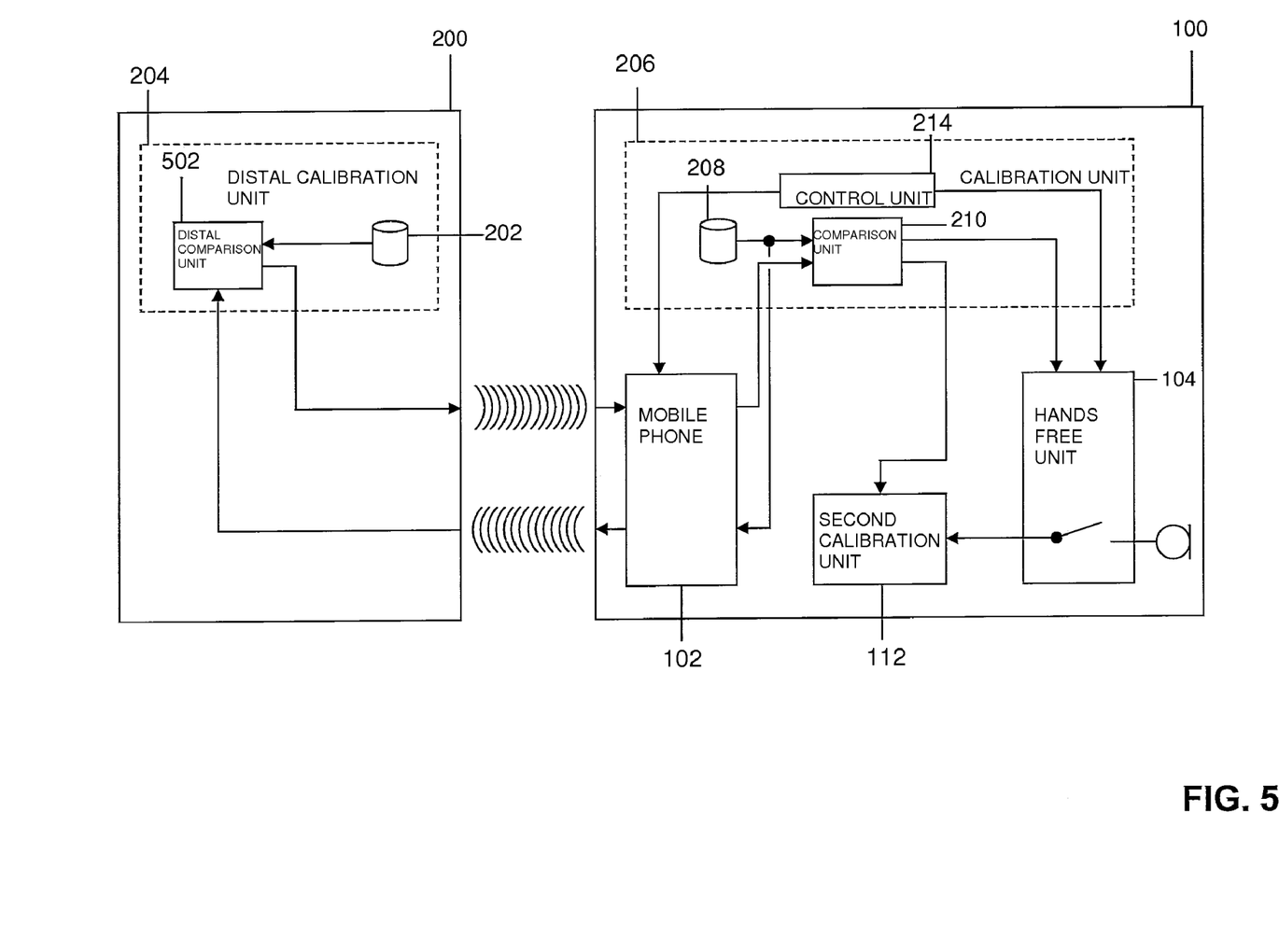
FIG. 5 illustrates an example of one implementation of a system for calibrating the transmitting path of a hands-free system.

FIG. 5 illustrates an example of one implementation of a system for calibrating the transmitting path of a hands-free system. In FIG. 5, a system is shown which could be used for calibrating the transmission path of the lands-free system 100 or mobile communication system. In connection with FIG. 5, reference numerals also shown in FIG. 2 designate the same units having the same function as shown in FIG. 2. In the implementation shown in FIG. 5, a test signal is selected from the storage unit 208 and is transmitted via the mobile phone 102 to the distant terminal 200. In the distant terminal 200 the distal calibration unit 204 includes a distal comparison unit 502 in which the received signal is compared to the reference test signal stored in the storage unit 202. In the distal comparison unit 502, the signal processing steps can be carried out as explained in connection with FIGS. 2 and 4. By way of example, it is possible to compensate signal level differences and to calculate the frequency response of the transmission path of the mobile phone 102.

As it is the case for the calibration of the receiving path of the hands-free system 100, the loudspeaker 106 of the hands-free system 100 may not be activated when the different signals are transmitted to the distant terminal 200. The user of the hands-free system 100 needs not to be bothered by the outputting of the different test signals via the loudspeaker 106.

Figure 6:
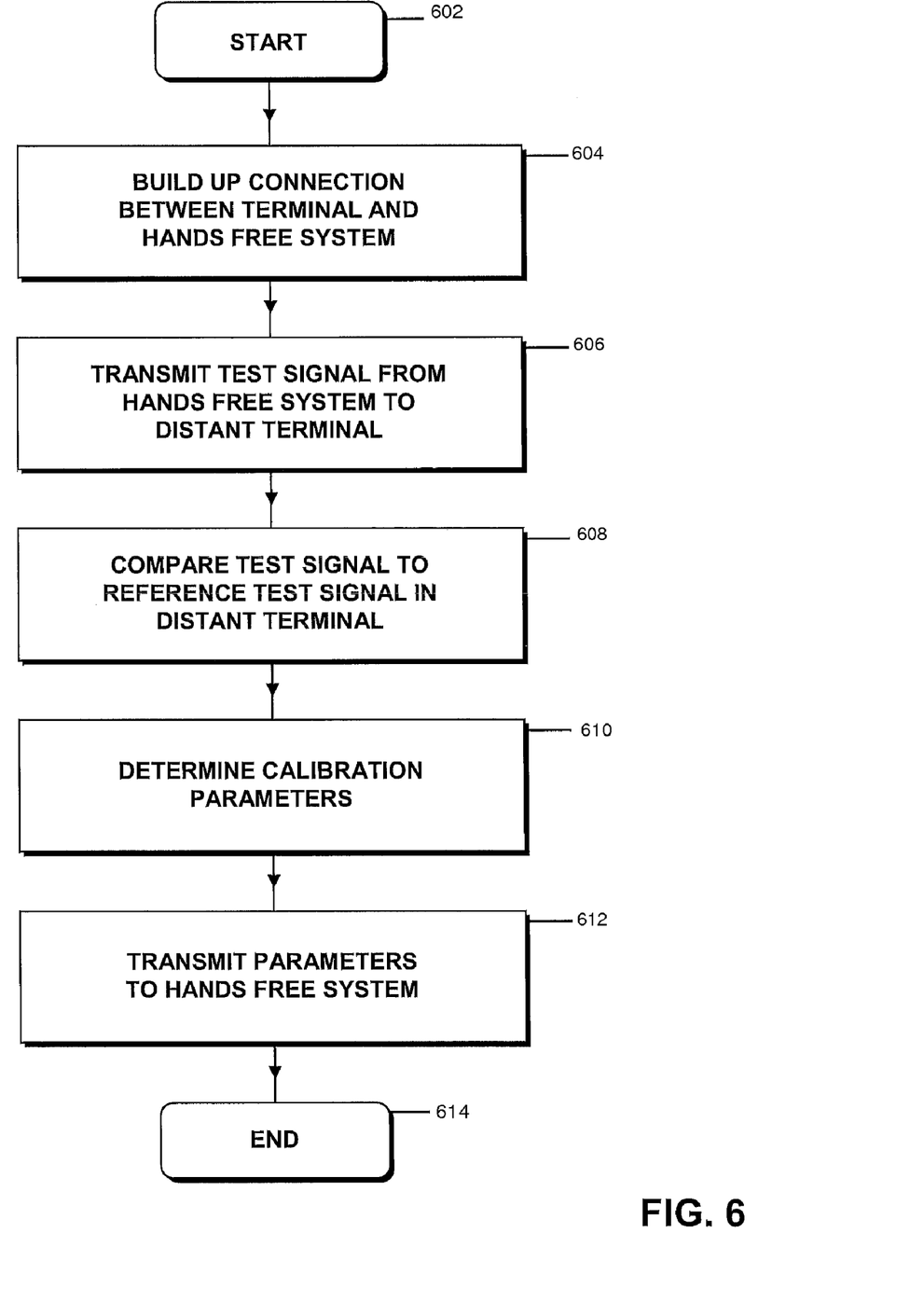
FIG. 6 illustrates a flowchart of one example of a method for calibrating the transmitting path of the system shown in FIG. 5.

FIG. 6 illustrates a flowchart of one example of a method for calibrating the transmitting path of the system shown in FIG. 5. After starting the processing in step 602, a connection is built up between the hands-free system 100 and the distant terminal 200 in step 604. The test signal selected from the storage unit 208 is then transmitted from the hands-free system to the distant terminals in step 606 where the received test signal is compared to the reference test signal stored in the storage unit 202, at step 608. The calibration or equalization parameters are then determined in step 610 in the comparison unit 502. With the help of a transmission protocol the calculated parameters are then transmitted to the hands-free system in step 612. The calibration parameters can then be used in the second calibration unit 112 calibrating the transmission path of the hands-free unit 104 and the mobile phone 102. When the calibration parameters have been stored in the hands-free system 100, the test signal processed by the calibration parameters can again be sent to the distant terminal 200. The distant terminal can then verify whether the transmitted test signal substantially corresponds to the reference test signal. If this is not the case the calibration steps can be repeated. The process of FIG. 6 ends at step 614.

As explained above, hands-free systems are often used with different mobile phones. Accordingly, the calibration system may further comprise means for identifying the mobile phone used in connection with the hands-free unit, the calibration unit starting to adapt the mobile phone to the hands-free unit when it is detected that a mobile phone is used in connection with the hands-free unit for which no calibration has been carried out. When it is determined that for the used mobile phone a calibration has already been carried out, it is not necessary to re-calibrate the system if not wanted by the user.

It is possible that the calibration is initiated by the user of the mobile phone. When the software of the mobile phone has been updated, the processing of the audio signal may have changed. In this case it might be desirable to recalibrate the hands-free system even if a calibration has been carried out for the same mobile phone with an older software version. In this case, the user can also initiate the calibration of a mobile phone which has already been used in connection with the hands-free unit.

The test signals may be provided in both locations—the distant terminal and the hands—free system. Depending on the fact which calibration parameter should be determined, different test signals may be used. These different test signals may either be stored in a storage unit provided in both the hands-free system and the distant terminal. However, it is also possible that means for generating the signals are provided. As mentioned above, the test signal may be generated by a shift register used in connection with a time variant attenuation element in order to generate a time variant test signal. Furthermore, means may be provided determining the propagation time or the time delay between the hands-free system and the mobile unit. When this time delay between the different signals is quantified, the two signals can be compared and the corresponding calibration parameters can be determined. As discussed above, the average signal level of the received test signal can be determined. To this end, a means for determining the average signal level may be provided.

According to another implementation of the invention, the system may further comprise means for determining whether an automatic feedback control of the signal amplification is carried out in the receiving path of the mobile phone. The system may further comprise means for determining whether a noise reduction is carried out in the receiving path of the mobile phone. Additionally, the system may comprise means for determining whether a signal level limitation is activated in the mobile phone.

In summary, this invention provides a possibility to calibrate each used mobile phone and to adapt the mobile phone to a hands-free unit. With the above-described invention it is possible to further improve the speech quality, as the calibration is not limited to the calibration depending on the type of mobile phone used. Instead, a calibration for each individual mobile phone is possible.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, persons skilled in the art will understand and appreciate, that one or more processes, sub-processes, or process steps described in connection with FIGS. 1-6 may be performed by hardware and/or software. Additionally, a calibration system, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. The claims and their equivalents define the scope of the invention.

What is claimed is:

1. A method for calibrating a hands-free system, the hands-free system comprising a hands-free unit and a mobile phone, the method comprising the following steps:
   setting up a connection between the hands-free system and a distant terminal via a mobile telephony network of the mobile phone;
   transmitting a predetermined test signal from one of the hands-free system and the distant terminal to the other of the hands-free system and the distant terminal, the predetermined test signal being provided in both the hands-free system and the distant terminal as reference test signal;
   comparing the received test signal to the reference test signal stored in the other of the hands-free system and the distant terminal; and
   determining the calibration parameters of the hands-free system in accordance with the comparison.

2. The method of claim 1, where for calibrating the receiving path of the hands-free system, the predetermined test signal is transmitted from the distant terminal to the hands-free system, the test signal received in the hands-free system is compared to the reference test signal provided in the hands-free system and the calibration parameters of the receiving path of the hands-free system are adapted in accordance with the comparison.

3. The method of claim 1, further comprising the step of identifying the mobile phone used in the hands-free system, and if it is detected that a mobile phone is used in the hands-free system for which no calibration has been carried out, the calibration steps are initiated.

4. The method of claim 1, where the received test signal transmitted from the distant terminal is not output via a loudspeaker of the hands-free system.

5. The method of claim 1, where a broadband time variant signal is used as test signal, the bandwidth of the test signal corresponding substantially to the bandwidth transmitted by the mobile phone.

6. The method of claim 5, where a composite source signal or an artificial voice signal is used as predetermined test signal.

7. The method of claim 5, where a shift register is used together with a time variant damping element to generate the predetermined test signal.

8. The method of claim 1, where the transmitted test signal and the reference test signal are generated the same way in the distant terminal and the hands-free system.

9. The method of claim 1, where, before the calibration parameters of the hands-free system are determined, the propagation time difference between the transmitted test signal and the reference test signal provided in the other of the distant terminal and the hands-free system is determined and removed.

10. The method of claim 1, where a time-averaged signal level of the received signal is determined and compared to the time-averaged signal level of the reference test signal, the calibration parameters being adapted in such a way that the signal level of the received test signal substantially corresponds to the signal level of the reference test signal.

11. The method of claim 1, where the power density spectrum of the received test signal is determined and compared to the power density spectrum of the stored signal, the equalizing parameters of the hands-free system being determined in such a way that the power density spectrum of the received test signal substantially corresponds to the power density of the reference test signal.

12. The method of claim 1, where it is determined if in the receiving path of the mobile phone an automatic feedback control of the signal amplification is carried out using a test signal with varying signal level, and if the amplification is controlled automatically, the automatic control of the signal amplification in the hands-free system is adjusted in the hands-free system depending on the signal amplification in the mobile phone.

13. The method of claim 1, where it is determined whether a noise reduction is carried out in the receiving path of the mobile phone by comparing the signal-to-noise-ratio of the received signal to the signal-to-noise-ratio of the provided reference signal, and in the affirmative the noise reduction in the hands-free system is adapted taking into account the noise reduction of the mobile phone.

14. The method of claim 1, where it is determined whether a signal level limitation is activated in the mobile phone, and in the affirmative, the amount of signal level limitation is determined and the signal level limitation in the hands-free system is adapted taking into account the signal level limitation of the mobile phone.

15. The method of claim 1, where the frequency response of the mobile phone is determined by comparing the spectrum of the received test signal to the spectrum of the reference test signal, the determined frequency response of the mobile phone being used for extending the bandwidth of the received audio signal of the mobile phone.

16. The method of claim 1, where when the connection between the hands-free system and the distant terminal is set up, the hands-free system transmits an identification code to the distant terminal and initiates the transmission of the test signal to the hands-free system.

17. The method of claim 1, where for calibrating the transmission path of the hands-free system, the predetermined test signal is transmitted to the distant terminal where the received signal is compared to the reference test signal provided in the distant terminal, the calibration parameters of the transmitter of the hands-free system being calculated at the distant terminal and transmitted to the hands-free system.

18. The method of claim 17, where for calibrating the transmission path of the hands-free system the loudspeaker of the hands-free system is not activated.

19. A system for calibrating a hands-free system, the hands-free system being used in connection with a mobile phone, the system comprising:
a hands-free system comprising:
a mobile phone;
a loudspeaker outputting a signal received by the mobile phone;
at least one microphone picking up a speech signal of a user of the hands-free system:
a first storage unit provided in the hands-free system storing a reference test signal;
a distant terminal transmitting a test signal to or receiving a test signal from the hands-free system, the distant terminal comprising a second storage unit storing the reference test signal, where the test signal is transmitted from one of the hands-free system and the distant terminal to the other of the hands-free system and the distant terminal; and
a calibration unit adapting the hands-free system to the used mobile phone, the calibration unit comparing the received test signal to the stored reference test signal and determines the calibrating parameters in accordance with said comparison.

20. The system of claim 19, further including a means for identifying the mobile phone used in connection with the hands-free system, the calibration unit starting to adapt the mobile phone to the hands-free system when it is detected that a mobile phone is used for which no calibration has been carried out.

21. The system of claim 19, further comprising a means for generating the test signal.

22. The system of claim 19, further comprising a means for determining the propagation time between the hands-free system and the mobile unit.

23. The system of claim 19, further comprising a means for determining the average signal level of the received test signal.

24. The system of claim 19, further comprising a means for determining the power density spectrum of the received test signal and of the reference test signal.

25. The system of claim 19, further comprising a means for determining whether an automatic feedback control of the signal amplification is carried out in the receiving path of the mobile phone.

26. The system of claim 19, further comprising a means for determining whether a noise reduction is carried out in the receiving path of the mobile phone.

27. The system of claim 19, further comprising a means for determining whether a signal level limitation is activated in the mobile phone.

* * * * *